350-3.6 SR

XR 3,566,021

TX 3031Y X 3035W X 3037E (4)

United States Patent

[11] 3,566,021

[72] Inventor William C. Jakes, Jr., Rumson, N.J.
[21] Appl. No. 779,842
[22] Filed Nov. 29, 1968
[45] Patented Feb. 23, 1971
[73] Assignee Bell Telephone Laboratories, Incorporated Murray Hill, Berkeley Heights, N.J.
Continuation-in-part of application Ser. No. 658,123, Aug. 3, 1967, now abandoned.

[54] REAL TIME THREE DIMENSIONAL TELEVISION SYSTEM
5 Claims, 3 Drawing Figs.

[52] U.S. Cl. .......... 178/6.5, 250/199, 350/3.5
[51] Int. Cl. .......... H04n 9/54
[50] Field of Search .......... 178/6.5; 250/199 (Cursory); 350/3.5 (Cursory)

[56] References Cited
UNITED STATES PATENTS
3,278,753 10/1966 Pitts .......... 250/199
3,444,316 5/1969 Gerritsen .......... 178/6.5
OTHER REFERENCES
Soroko-Holography and Interference Processing of Information Soviet Physics— Copyright by American Institute of Physics 1967 March-April 1967— pgs. 643, 666— 667

*Primary Examiner*—Richard Murray
*Assistant Examiner*—Jr., Joseph A. Orsino
*Attorneys*—R. J. Guenther and E. W. Adams, Jr.

ABSTRACT: This disclosure relates to a television system that utilizes wave front reconstruction techniques to provide a real time three-dimensional image at the receiving end of the system, with the image changing in perspective as the object and/or observer moves. The coherent light from a laser is first modulated at a frequency in the microwave range and one sideband of the coherent light is filtered out and used to illuminate an object scene. The light reflected from the object scene impinges on a photodetector while a narrow reference beam of coherent light raster scans the photodetector to thereby generate a signal which is modulated in phase and amplitude in accordance with the interference pattern formed on the photodetector. The signal carrying the modulated phase and amplitude information is then transmitted to a remote receiver. At the received end, the phase and amplitude modulated information is recovered and stored, a frame at a time, in respective storage devices. At the end of a complete frame the stored information is read out and respectively applied to an array of phase and amplitude optical modulators. Also, at the end of a complete frame received information, a second laser at the receiver is pulsed with the light therefrom directed toward said array. In this manner, an image of the original object is obtained at the receiver. The described operation is continued a frame at a time.

3566021
NO OR CLASSIF

INVENTOR
W. C. JAKES, JR.
BY John K. Mullarney
ATTORNEY

REAL TIME THREE DIMENSIONAL TELEVISION SYSTEM

CROSS REFERENCE TO RELATED APPLICATION

This application is a continuation-in-part of my copending application Ser. No. 658,123, filed Aug. 3, 1967 now abandoned.

BACKGROUND OF THE INVENTION

This invention relates to television techniques and, more particularly, to a television system utilizing wave front reconstruction techniques to achieve a real time three-dimensional display at a remote receiver location.

Television systems for reproducing at a remote receiver location an image of the object or scene viewed by a "camera" tube at the transmitter location are, of course, well known and in wide usage today. However, the receiver image is only two-dimensional.

The wave front reconstruction process, apparently first proposed by Dennis Gabor of the Imperial College of Science and Technology in London, has been used successfully to produce three-dimensional photographic pictures that have a surprising realism. As is explained, for example, in the article by Leith and Upatnicks entitled "Photography by Laser," Scientific American, Volume 212, No. 6, page 24, Jun. 1965, wave front reconstruction is a photographic recording of light wave patterns which are formed by the interference of a reference light beam with light reflected from an object. Wave front reconstruction differs from a conventional photographic transparency in that light wave patterns representing an image, rather than the image itself, are recorded on the photographic medium. When the wave front reconstruction pattern is then illuminated by coherent light, an image of the original object is projected therefrom which is visually perceivable, in three dimensions, as the object itself.

It is the purpose of the present invention to utilize the essential principles of wave front reconstruction in a television system to provide a real time three-dimensional image of the object or scene at the receiving end of the system.

SUMMARY OF THE INVENTION

It is accordingly the primary object of the present invention to achieve a real time, three-dimensional television display system.

It is a further object of the invention to produce at the transmitting end of a television system a signal which has a carrier in the microwave region and is modulated in phase and amplitude in accordance with the interference pattern that is related to the object scene reflected light by scanning a coherent reference beam with respect to said reflected light.

These and other objects are obtained in accordance with the present invention wherein coherent light from a source such as a laser is first modulated at a frequency in the microwave region and one sideband of the coherent light is filtered out and used to illuminate the object scene. Light reflected from the object scene impinges on a photodetection plate (e.g., photomultiplier or equivalent) while a narrow reference beam of light scans, in a raster type manner, the photodetection plate to thereby generate a signal in the microwave region which is modulated in phase and amplitude in accordance with the interference pattern formed on the photodetection means. Means are provided at the transmitter to inhibit horizontal and vertical flyback signals.

The microwave signal carrying the modulated phase and amplitude information is then transmitted to a remote receiver. At the receiver end, the phase and amplitude modulated information is recovered and stored in respective delay line devices, a frame at a time. At the end of a complete frame the stored information is read out and respectively applied to an array of phase and amplitude optical modulators. Also, at the end of a complete frame, a second laser at the receiver is pulsed with the light therefrom directed toward said array. In this manner, an image of the original object scene is obtained at the receiver. The described operation is continued a frame at a time.

DETAILED DESCRIPTION

Figure 1:
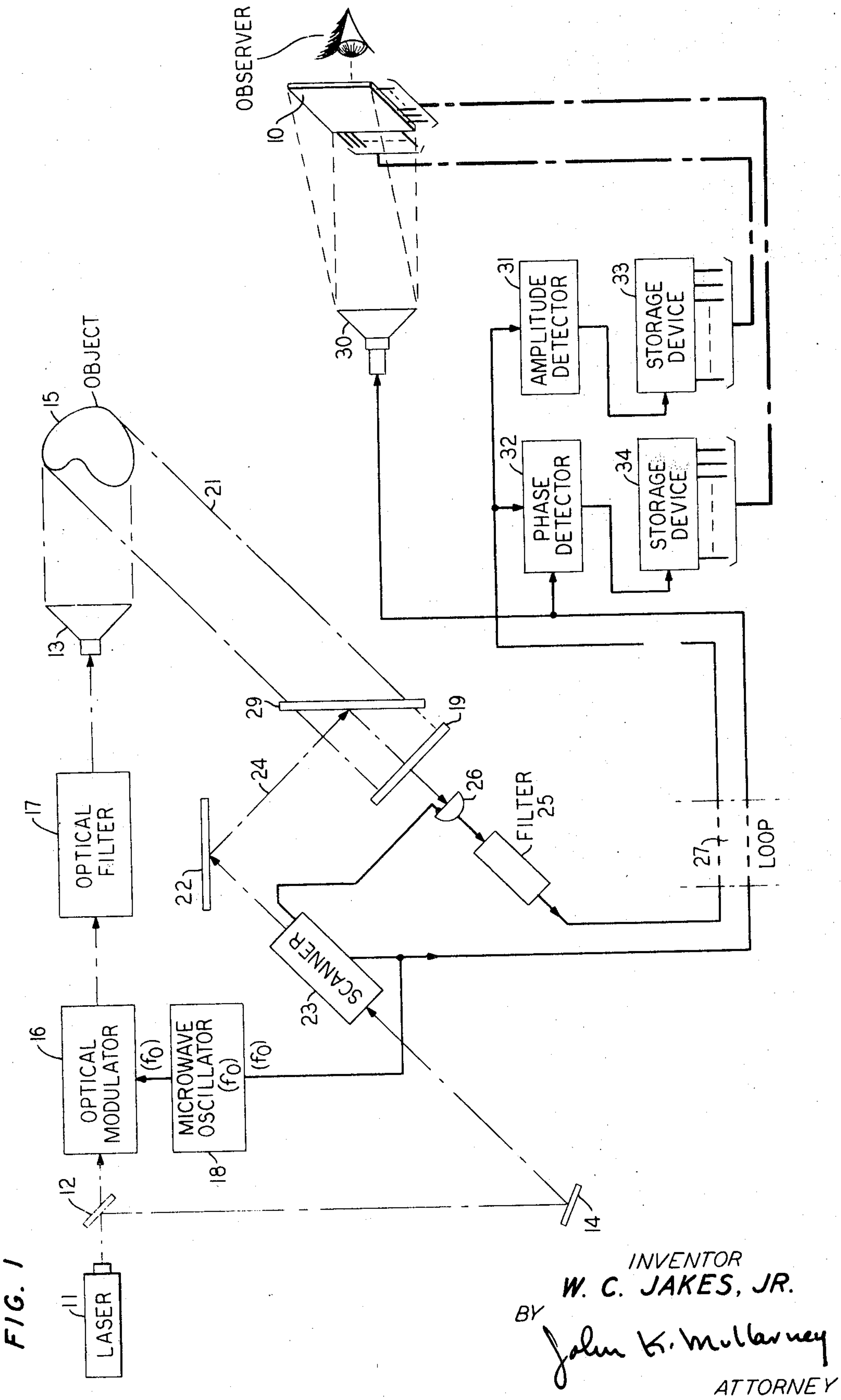
FIG. 1 illustrates a simplified schematic block diagram of a television system in accordance with the present invention.

Referring now to the drawings, FIG. 1 shows in simplified schematic block form a real time, three-dimensional television system in accordance with the present invention. The apparatus comprises a source of monochromatic coherent light such as a single mode laser 11, a partially reflecting mirror 12 and an optical lens package 13. The mirror 12 is designed to transmit therethrough approximately half of the impinging coherent light, while reflecting the other approximate half to mirror 14. Since the light beam from the laser is dimensionally small (e.g. a diameter of 2 millimeters or less) a series of lenses (i.e., lens package 13) is utilized to insure that the entire object or scene 15 is illuminated by the coherent light from laser source 11.

Interspersed in the coherent light beam path between mirror 12 and lens package 13 are an optical modulator 16 and an optical filter 17. The nonlinear optical modulator 16 comprises an electro-optic crystal similar in nature to the electro-optic crystals shown in FIG. 3, which will be described in detail hereinafter. Across the plates of the electro-optic crystal modulator 16 there is applied a signal $f_o$ generated by the microwave oscillator 18. This signal derived from oscillator 18 is preferably in the microwave region and serves to modulate (e.g. either amplitude or frequency modulation may be used) the coherent light from source 11. Accordingly, the output of the nonlinear optical modulator 16 comprises a signal whose frequency is the same as the incident coherent light as well as the upper and lower sidebands thereof resulting from the modulation process. The optical filter 17 serves to eliminate all signals except one of these sideband signals (i.e., either the upper or lower sideband, it being immaterial which sideband is eliminated and which is used to illuminate the object scene). The optical filter 17 may comprise a Fabry-Perot type filter.

When the single sideband of coherent light is reflected from object 15, part of it impinges on the photodetection plate or array 19, as shown by the light beam path 21. The schematically illustrated photodetector 19 may comprise the plate of a conventional photomultiplier tube, an array of photodetector diodes or any other device known in the art which takes impinging light rays and converts the same to electrical signal current, or voltage.

Simultaneously, the part of the coherent light reflected by mirror 12 and mirror 14 is delivered to the mirror 22 via the scanner 23. The light reflected by mirror 22 via the scanner 23. The light reflected by mirror 22 is, once again, reflected by the beam splitter 29 and it then impinges on the photodetection plate or array 19, as shown by the light beam path 24. The light reflected from mirror 22 and beam splitter 29 maintains its coherency and substantially its same general characteristics. On the other hand, light reflected from the irregular object scene is diffuse and has irregular wave fronts although this reflected light is nevertheless temporally coherent and monochromatic.

Disregarding for the moment the function and purpose of the scanner 23, it is known to those skilled in the wave front reconstruction art that when two light beams, such as 21 and 24, reach the plate 19 they will interfere constructively and destructively. At those locations at which the two light components add in phase, they will illuminate the plate to a greater extent than at those locations at which the two components are out of phase and are therefore mutually destructive. Now if the plate 19 were a photographic recording film, a hologram recording such as shown and described in the article by Leith and Upatnicks would be obtained. And as further explained in said article, an image of the object scene 15 may later be reconstructed from the hologram recording by properly illuminating the hologram with a reference beam of coherent light corresponding to the original reference beam.

The scanner 23 serves the purpose of scanning the reference beam, in a raster type manner, over the photodetection plate 19. Accordingly, the pointlike reference beam (i.e., on the order of 10 microns) is caused to scan horizontally across the width of the photodetection plate 19 and then rapidly snap back to the starting edge and begin a second horizontal scan somewhat below the first horizontal scan. This process is continuously carried out until the entire plate has been so scanned, and the process is then repeated. As the scanned beam and the object reflected light beam interfere constructively and destructively with each other, in the same manner as described, a corresponding current will be developed at the output, which current will comprise a carrier with a frequency of $f_0$ and this carrier is modulated in phase and amplitude in accordance with the interference pattern generated by the interfering beams of light.

To generate a suitable signal, modulated as described, the aperture defined by the waist of the reference beam must be sufficiently small so as to resolve the highest spatial frequency of the object beam. And a small waist or aperture corresponds, of course, to a large cone angle of convergence. Now if the object should appear to lie outside this cone of convergence, the aperture of the scanning beam will prove too large to resolve the highest spatial frequency of the object beam. Thus, as will be apparent, the object should preferably appear to fall or lie within the aforementioned cone of convergence. This can be most readily accomplished by the use of a conventional beam splitter 29 positioned as shown in FIG. 1 of the drawings. Looking from the photodetector surface, the object will appear to lie within the cone of convergence of the reference beam, assuming of course an adequate cone angle as described above, and yet the object in no way obscures any part of the reference beam, or vice versa. This cone of convergence has not been shown in the drawing since the same will be readily appreciated by those in the art.

The beam splitter 29, which brings the two incident beams into the desired condition of overlap, is of the conventional type, i.e., it serves to transmit or pass approximately half of the incident light while reflecting the remaining half.

The aforementioned scanning may be carried out mechanically with rotating optical mirrors or by various electro-optical arrangements known in the art. Accordingly, the invention should in no way be construed as limited to any particular known method of scanning the reference beam 24 over the photodetection plate. The simplest scanning technique is, of course, a sequential line-by-line scan; however, interlaced scanning is also feasible and the invention is in no way limited to the particular type scan utilized.

The output current signals from the photodetection means 19 may be amplified, if desired, and then delivered to the filter 25 via the inhibit gate 26. The filter 25 serves to pass the desired output carrier signal $f_0$ and its related sidebands, while blocking or inhibiting all other unwanted modulation products. The output from filter 25 thus comprises the carrier signal $f_0$ which is modulated in phase and amplitude in accordance with the interference pattern formed on the photodetection plate.

The output of the filter 25 is delivered to a transmission facility or loop 27, such as a coaxial cable or a radio relay system. The transmission facility also carries as a distinct and separate signal (e.g. over separate wire pairs in a coaxial cable) the microwave oscillator signal $f_0$. This oscillator signal is used by the phase detector at a remote receiver location for recovering the phase modulated information from the received video signal.

The signals generated during each horizontal flyback period of the raster scan across photodetection plate 19 are of relatively short duration and for this reason they have little effect on the image of the original object, seen at a remote location. Hence no attempt usually need be made to eliminate the same. The vertical flyback periods, however, are of relatively long duration and therefore it is desirable that these be eliminated at the transmitting end of the system. To this end, an inhibit signal is generated at the beginning of each vertical flyback period and the same is applied as an inhibit input to gate 26 to inhibit transmission therethrough. The inhibit signal can be generated by a sensor (e.g. a metal strip on the appropriate rotating mirror and an associated brush) on the rotating mirror, of the scanner, that accomplishes the vertical displacement of the reference light beam during a raster scan. Should the horizontal flyback periods prove annoying they can be readily eliminated in the same manner as the vertical flyback periods.

A amplitude pulse type signal corresponding to the aforementioned vertical inhibit signal is also superimposed on the transmitted microwave signal $f_0$ and the same serves to pulse the coherent light source at the remote receiver in a manner and for the purpose to be described hereinafter. This superimposed pulse type signal should be relatively larger in amplitude than the transmitted microwave signal $f_0$ so as to be readily distinguishable therefrom at the remote receiver.

Summarizing the above, two separate and distinct signals are transmitted to a remote receiver location. The first comprises the microwave video signal which is modulated in phase and amplitude in accordance with the interference pattern formed on the photodetection means 19; this latter signal is derived from filter 25. The second signal is the microwave modulating carrier signal $f_0$ and the superimposed, periodically recurring, large amplitude pulses that correspond in time to the initiation of the vertical flyback periods of the swept reference beam.

Turning now to the remote receiver, a typical receiver of a television system in accordance with the invention is shown in FIG. 1 to comprise amplitude and phase detectors 31 and 32, respectively, and a pair of similar storage devices 33 and 34 to which the outputs from the amplitude and phase detectors 31 and 32 are respectively applied. The received microwave video signal which is modulated in amplitude and phase in accordance with the interference pattern formed on the photodetection means 19 is delivered to both the amplitude and phase detectors 31 and 32. The detector 31 may comprise a conventional amplitude detector which produces an output signal which is proportional to the amplitude modulation of the received video signal. The microwave oscillator signal $f_0$ that is separately transmitted to the receiver is also fed to the phase detector 32. The detector 32 may comprise any state of the art phase detection circuit which compares the phase variations of the received video signal against the microwave signal $f_0$ from oscillator 18 and it serves to produce in response to this comparison an output signal which is proportional to the varying phase difference between the two input signals thereto.

The storage devices 33 and 34 are preferably similar to each other and can comprise delay lines of the magnetostrictive or ultrasonic type, the choice being immaterial for purposes of the present invention. Each delay line is of a length such as to provide a delay therein equivalent to one frame period of the aforementioned raster scan of the reference beam over photodetection plate 19. Thus, each storage device can store one complete frame of information of the received video signal. Each storage device has multiple taps thereon spaced between the input and output ends thereof. The exact number of taps from each storage device depends upon the number of electro-optical modulators comprising the display array; see in this regard FIG. 2 which shows the display array in greater detail. If the display array is assumed to comprise 100 rows and 100 columns of electro-optical modulators, each delay line would have 10,000 tapoff points (100 × 100 = 10,000) and each tapoff point is respectively connected to a selected one of the electro-optical modulators.

Figure 2:
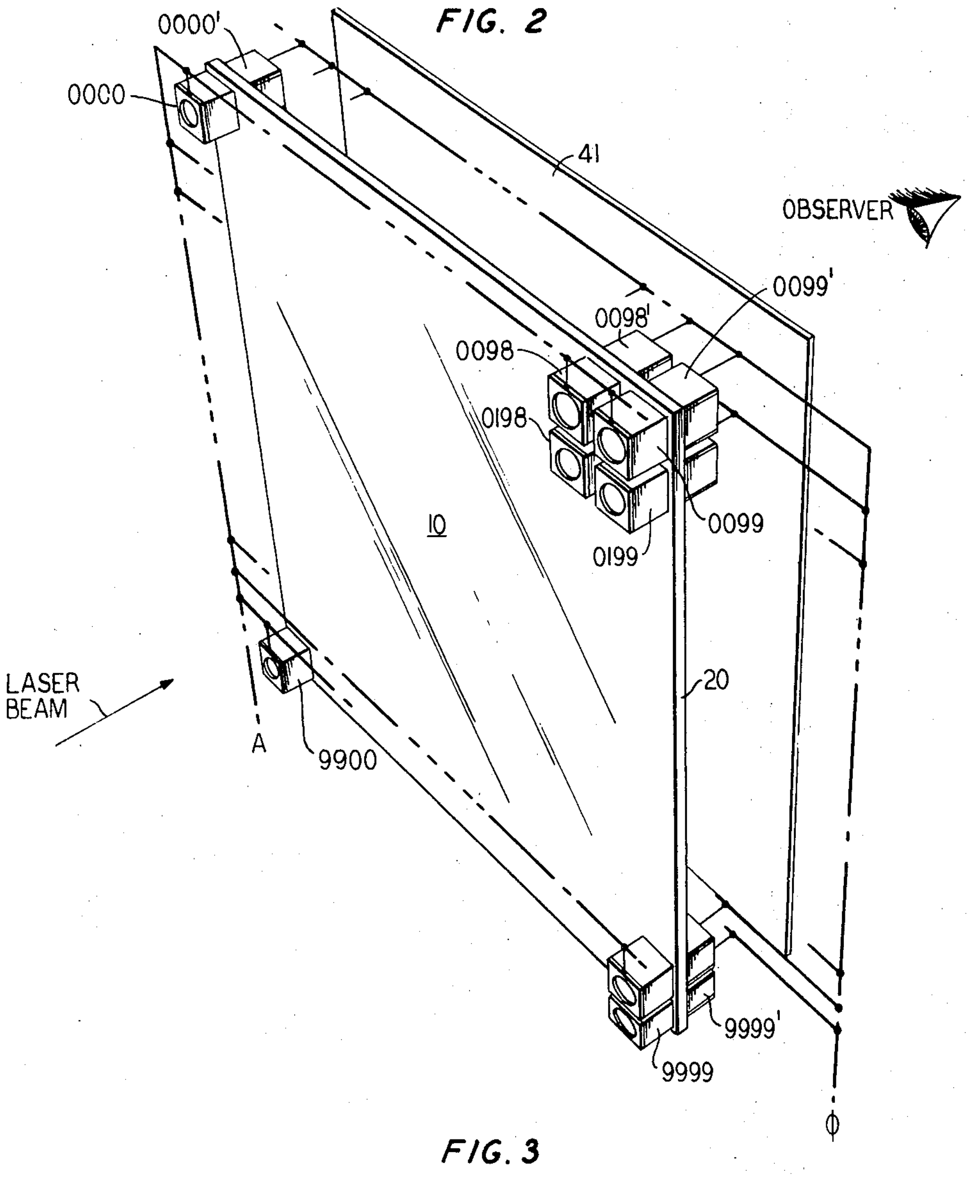
FIG. 2 illustrates a simplified schematic diagram of a receiver optical modulator array in accordance with the invention.

The display array 10, comprising a large plurality of spaced electro-optical crystalline devices, is shown as merely a block in FIG. 1; it is illustrated in greater detail in FIG. 2 of the drawings. As indicated in FIG. 2, the crystalline devices are arranged in a plurality of horizontal rows and vertical columns (e.g. 100 rows and 100 columns). The electro-optical crystalline devices are supported on a thin square block of electrically conductive, grounded, metallic material 20. This support is effected by force fitting the crystalline devices in respective holes appropriately punched in the thin metal block 20.

The first row of crystalline devices, for amplitude modulating the coherent light beam from the pulsed source of coherent light 30, comprises the crystalline devices 0000-—0098, 0099. The first two digits of the latter numbers indicate the row the device is in and the last two digits indicate the location or column of a given crystalline device in that row. Thus, the device 0099 lies in the first row of the array and is the very last device in that row. For the next row, the crystalline devices are numbered 0100 (not shown) ... 0198, 0199. The crystalline devices of the last row are numbered 9900—9999.

The crystalline devices used for phase modulating the coherent light beam from the pulsed source of coherent light 30 are similarly numbered, with a prime (′) added to distinguish the same from the amplitude modulating crystalline devices. Thus, the device 0000′ lies in the first row and first column of the phase modulating array of crystalline devices, while the device 0099′ lies in the first row and last column. And the crystalline device 9999′ lies in the last row and last column. Disregarding the prime, the crystalline devices bearing the same number are coaxially aligned, as is evident from FIGS. 2 and 3 of the drawings. That is, the devices numbered 0000 and 0000′ are coaxially aligned, as are the devices numbered 0099 and 0099′, the devices numbered 9999 and 9999′, and so on. Thus, the coherent light passing through the crystalline device 0000 also passes through the crystalline device 0000′. In this fashion the incident coherent light is amplitude modulated and then phase modulated in accordance with the stored information derived from the received video signal.

Counting from the output end, or right-hand side, of the storage device 33, the first 100 tapoff points of said device are respectively connected to the crystalline devices 0000—0098 and 0099. The next 100 tapoff points are respectively connected to the crystalline devices 0100 (not shown)... 0198 and 0199, while the last 100 tapoff points, most adjacent the input end of the storage device 33, are respectively connected to the crystalline devices 9900—9999.

In similar fashion, counting from the output end of the storage device 34, the first 100 tapoff points of said device are respectively connected to the crystalline devices 0000′—0098′ and 0099′. And the last 100 tapoff points, most adjacent the tapoff end of the storage device 24, are respectively connected to the crystalline devices 9900′ (not shown)...9999′.

With a complete frame of video information stored in the storage devices 33 and 34, the potential applied to the respective crystalline devices 0000—0099 and 0000′—0099′ is equivalent to the recovered amplitude and phase modulation, respectively, resulting from the first horizontal scan over photodetection plate. That is, the potential applied to the first row of crystalline devices corresponds to 100 samples of the amplitude and phase modulations encountered during the first transmitter horizontal scan. The second row of crystalline devices corresponds to 100 samples of the amplitude and phase modulations resulting from the second transmitter horizontal scan; and so on. The last horizontal scan results in 100 samples of the last horizontal scan over photodetection means 19 being applied to the amplitude and phase related crystalline devices 9900—9999 and 9900′ (not shown)... 9999′.

Thus, when a complete frame of information is stored in storage devices 33 and 34, samples of the amplitude and phase modulations encountered during a complete raster scan are applied to the array of crystalline devices, there being 100 samples per horizontal scan and 100 of the latter. Accordingly, 10,000 samples per frame are applied to the display array 10, this being adequate to provide a distinct image at the receiver of the original object scene.

The oscillator signal $f_0$ is not of sufficient amplitude to excite the coherent laser light source 30 at the remote receiver; whereas, the superimposed, periodically recurring pulses that correspond in time to the initiation of the vertical flyback periods of the swept reference beam are of sufficient amplitude to operatively excite the laser source 30 which then illuminates the display array with monochromatic coherent light. Thus, laser source 12 is operatively energized at the end of each frame scan. In this regard, a clipper can readily be interposed, if desired, between the receiver input terminal and source 30 to completely eliminate the oscillator signal $f_0$, while passing only the aforementioned large amplitude, superimposed, periodically recurring pulses to source 30.

Figure 3:
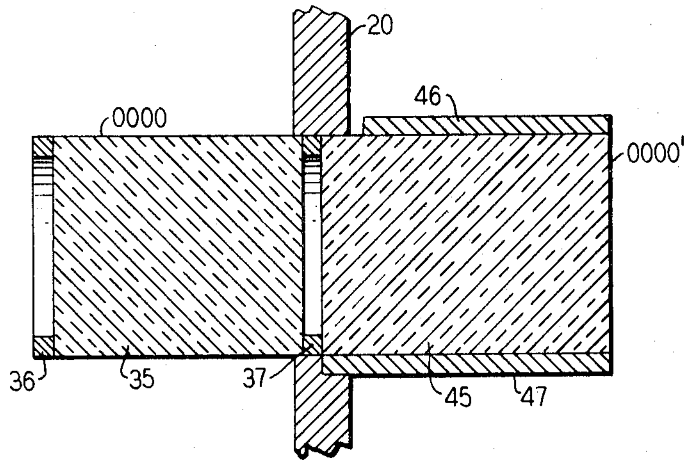
FIG. 3 illustrates in cross section a typical optical modulator used in the array of FIG. 2.

As shown in FIGS. 2 and 3, the electro-optical crystalline devices of the display array 10 comprises a first group of devices (e.g. 0000) for amplitude modulating the coherent light from source 30 and a second group of devices (e.g. 0000′) for phase modulating the coherent light. The amplitude modulation and phase modulation crystalline devices bearing the same number are coaxially aligned and force fit into holes appropriately punched in the thin metallic block 20. The crystalline device 0000 shown in FIGS. 2 and 3 comprises a block 35 of potassium dihydrogen phosphate (KDP) or lithium niobate, or any other equivalent crystalline material exhibiting electro-optical properties. The thin electrodes 36 and 37, of silver or the like, are bonded to the ends of the electro-optical crystal 35 and each has a properly sized hole therein to permit passage of the coherent light beam therethrough. The output tap of the storage device 33 most adjacent the output end thereof is electrically connected to the electrode 36. The electrode 37 is in contact with the ground plate 20 and is hence at ground potential.

The crystalline device 0000′ shown in FIGS. 2 and 3 likewise comprises a block 45 of KDP or lithium niobate or any other equivalent crystalline material exhibiting electro-optical properties. The thin electrodes 46 and 47 of silver or the like are bonded, using conventional techniques, to opposite, horizontally lying faces of the electro-optical crystal material 45. The output tap of the storage device 34 most adjacent the output end thereof is electrically connected to the electrode 46. The electrode 47 is in contact with the ground plate 20 and hence is at ground potential.

A thin sheet of plane polarized material 41 is placed between the crystalline array 10 and the observer. This sheet eliminates any circularly polarized light and passes only that vector of the incident light which is polarized in the same direction as the plane polarized material 41. The direction of polarization of the polarized sheet 41 is preferably either parallel or perpendicular to the polarization of the incoming coherent light from source 30.

When the laser 30 is momentarily pulsed at the end of each frame an instantaneous image of the original object or scene is obtained at the receiver and projected toward an observer. The above-described operation is carried out at the receiver a frame at a time and thereby presents to an observer a real time three-dimensional image of the original object or scene. The operation is carried out a sufficiently high rate (e.g. 30 or more frames per second) to present a continuous picture to an observer.

It is to be understood that the above-described embodiment is merely illustrative of the principles of the present invention and that numerous modifications or alterations may be made therein without departing from the spirit and scope of the present invention.

I claim:

1. In a real time three-dimensional television system having a transmitter, one or more remote receivers, and a transmission facility for sending signals generated at the transmitter to said remote receivers, a source of coherent light located at the transmitter, means for nonlinear modulating at a microwave frequency said coherent light, means for filtering out all but one sideband of the said coherent light, means for illuminating an object scene with said one sideband of coherent light, photodetection means positioned to receive a portion of the light reflected from said object scene, means for also deriving a narrow reference beam of coherent light from said source, and means for raster scanning the reference beam over said photodetection means to generate an alternating current signal having a carrier in the microwave region which is modulated in phase and amplitude in accordance with the interference pattern produced by the interfering light beams impinging on the photodetection means.

2. A real time three-dimensional television system comprising a source of coherent light, means for nonlinear modulating the coherent light at a frequency in the microwave range, means for filtering out all but one sideband of the modulated light, means for illuminating one object scene with said one sideband for modulated light, means for also deriving a narrow reference beam of coherent light from said source, photodetection means positioned to receive a portion of the light reflected from said object scene, means for scanning in a raster type manner the reference beam over said photodetection means to generate a signal which is modulated in phase and amplitude in accordance with the interference pattern produced by the interfering light beams impinging on the photodetection means, means for transmitting the aforementioned modulated signal to a remote receiver, means for recovering the phase and amplitude modulation information and for storing the same a frame at a time in respective storage devices, means for reading out samples of the stored information at the end of each complete frame, means for applying the phase and amplitude samples to respective optical modulators arranged in an array, and means at the end of each complete frame for pulsing a second coherent light source located at the receiver with the light therefrom directed toward said array whereby an instantaneous image of the original object scene is obtained at the receiver.

e. A system in accordance with claim 3 wherein the microwave modulating frequency is also transmitted to the remote receiver and utilized to recover the phase modulated information from the transmitted phase and amplitude modulated signal.

4. A system in accordance with claim 2 wherein a signal is sent to the receiver coherent light source at the end of each transmitter raster scan for pulsing the same at the end of each complete frame.

5. A system in accordance with claim 2 wherein each of said respective storage devices comprises a delay line having multiple taps thereon and the array of optical modulators comprises a plurality of electro-optical crystalline devices equal in number to the number of taps on said storage devices, and means for electrically connecting each tap of each delay line to a respective selected electro-optical crystalline device.